United States Patent
Steinwandel et al.

(10) Patent No.: US 10,435,169 B2
(45) Date of Patent: Oct. 8, 2019

(54) HYBRID ELECTRIC DRIVE TRAIN FOR VTOL DRONES

(71) Applicant: Airbus Defence and Space GmbH, Taufkirchen (DE)

(72) Inventors: Jürgen Steinwandel, Uhldingen-Mühlhofen (DE); Ning Wang, München (DE); Michael Judas, München (DE); Jan Van Toor, München (DE)

(73) Assignee: Airbus Defence and Space GmbH (DE)

( * ) Notice: Subject to any disclaimer, the term of this patent is extended or adjusted under 35 U.S.C. 154(b) by 466 days.

(21) Appl. No.: 15/220,624

(22) Filed: Jul. 27, 2016

(65) Prior Publication Data

US 2017/0029131 A1 Feb. 2, 2017

(30) Foreign Application Priority Data

Jul. 29, 2015 (EP) ..................................... 15178886

(51) Int. Cl.
*B64D 35/08* (2006.01)
*B64D 27/24* (2006.01)
(Continued)

(52) U.S. Cl.
CPC .......... *B64D 35/08* (2013.01); *B64C 29/0025* (2013.01); *B64C 39/024* (2013.01);
(Continued)

(58) Field of Classification Search
CPC ........ B64C 2201/042; B64C 2201/044; B64C 2201/088; B64C 2201/104;
(Continued)

(56) References Cited

U.S. PATENT DOCUMENTS

| 3,181,810 A | 5/1965 | Olson |
| 3,592,412 A | 7/1971 | Glatfelter |

(Continued)

FOREIGN PATENT DOCUMENTS

| DE | 6602227 U | 4/1969 |
| DE | 10 2005 040887 A1 | 6/2006 |

(Continued)

OTHER PUBLICATIONS

Jan. 19, 2016 Search Report EP 15178886.6.
U.S. Appl. No. 14/915,101, filed Feb. 26, 2016.

*Primary Examiner* — Medhat Badawi
(74) *Attorney, Agent, or Firm* — Lerner, David, Littenberg, Krumholz & Mentlik, LLP (57) ABSTRACT

A vertical take-off aircraft with a propulsion drive for generating a driving force being effective in a horizontal direction and with a lift drive for generating a lifting force being effective in a vertical direction includes a motor for providing mechanical energy for the propulsion drive and a first generator for providing electrical energy for the lift drive. Moreover, the aircraft includes an exhaust gas turbocharger for the motor with a first turbine being driven by an exhaust gas flow of the motor, wherein the first turbine is configured to provide mechanical energy for the propulsion drive.

14 Claims, 4 Drawing Sheets

(51) Int. Cl.
  *B64C 39/02* (2006.01)
  *B64C 29/00* (2006.01)
  *B64D 27/02* (2006.01)

(52) U.S. Cl.
  CPC ........ B64D 27/24 (2013.01); *B64C 2201/042* (2013.01); *B64C 2201/044* (2013.01); *B64C 2201/088* (2013.01); *B64C 2201/104* (2013.01); *B64C 2201/108* (2013.01); *B64C 2201/162* (2013.01); *B64D 2027/026* (2013.01)

(58) Field of Classification Search
  CPC ........ B64C 2201/108; B64C 2201/162; B64C 29/0025; B64C 39/024; B64D 2027/026; B64D 27/24; B64D 35/08
  See application file for complete search history.

(56) References Cited

U.S. PATENT DOCUMENTS

| | | | |
|---|---|---|---|
| 6,293,491 | B1 | 9/2001 | Wobben |
| 7,174,714 | B2* | 2/2007 | Algrain ............... F02D 23/00 290/40 A |
| 7,753,036 | B2* | 7/2010 | Lents .................. F01C 1/22 123/559.1 |
| 8,152,096 | B2 | 4/2012 | Smith |
| 8,636,241 | B2* | 1/2014 | Lugg .................. B64C 29/0025 244/12.1 |
| 9,120,560 | B1 | 9/2015 | Armer et al. |
| 9,187,174 | B2 | 11/2015 | Shaw |
| 9,248,908 | B1* | 2/2016 | Luyks .................. B64C 27/12 |
| 2002/0148227 | A1* | 10/2002 | Mackay ................ F02C 1/06 60/772 |
| 2003/0062443 | A1 | 4/2003 | Wagner et al. |
| 2004/0245374 | A1 | 12/2004 | Morgan |
| 2006/0123784 | A1* | 6/2006 | Algrain ............... F02D 23/00 60/608 |
| 2006/0151666 | A1 | 7/2006 | VanderMey et al. |
| 2008/0102010 | A1* | 5/2008 | Bruck .................. B01D 53/90 423/213.2 |
| 2008/0169375 | A1* | 7/2008 | Ishikawa ............. B64C 29/0025 244/12.1 |
| 2009/0007882 | A1* | 1/2009 | Lents .................. F01C 1/22 123/200 |
| 2011/0042508 | A1 | 2/2011 | Bevirt |
| 2012/0234968 | A1 | 9/2012 | Smith |
| 2012/0269633 | A1* | 10/2012 | Danforth ............... F02K 9/00 416/170 R |
| 2013/0020429 | A1 | 1/2013 | Kroo |
| 2014/0123624 | A1* | 5/2014 | Minto ................. F23N 5/18 60/39.281 |
| 2015/0152791 | A1* | 6/2015 | White ................. F02C 9/26 60/773 |
| 2015/0285165 | A1* | 10/2015 | Steinwandel .......... B64D 27/02 244/55 |
| 2016/0047298 | A1* | 2/2016 | Lofgren ............... F02B 37/14 60/273 |
| 2016/0167799 | A1* | 6/2016 | Smaoui ................ F02C 6/12 701/16 |
| 2016/0207625 | A1* | 7/2016 | Judas ................. B64C 29/0025 |
| 2017/0292447 | A1* | 10/2017 | Himmelmann ........ B64D 27/10 |

FOREIGN PATENT DOCUMENTS

| | | |
|---|---|---|
| DE | 10 2009 048201 A1 | 4/2011 |
| DE | 10 2012 021339 A1 | 4/2014 |
| DE | 10 2013 109 392 A1 | 3/2015 |
| EP | 2 011 962 A2 | 1/2009 |
| KR | 10 2012 006 05 09 A | 10/2005 |
| RU | 2001836 C1 | 10/1993 |
| RU | 2543120 C1 | 2/2015 |
| WO | 2004/012993 A1 | 2/2004 |
| WO | 2006/113877 A2 | 10/2006 |
| WO | 2015/028627 A1 | 3/2015 |

* cited by examiner

HYBRID ELECTRIC DRIVE TRAIN FOR VTOL DRONES

FIELD OF THE INVENTION

The invention relates to drive systems for vertical take-off aircrafts. In particular, the invention relates to a vertical take-off aircraft.

BACKGROUND OF THE INVENTION

Vertical take-off aircrafts, in particular drones, have advantageous characteristics with regard to targets to be headed for. Thereby, it is of major significance that vertical take-off aircrafts or drones, respectively, do not require a runway or landing strip as they can land or take-off vertically from the ground. With such vertical take-off aircrafts it is further possible to float above a specific target as to thereby carry out observation missions, for example, wherein the floating may also be referred to as hovering. Thereby, the vertical take-off aircrafts may hover above one and the same target multiple minutes, but also multiple hours, as to thereby capture specific objects on ground during the observation mission. A vertical take-off aircraft is a helicopter, for example. During long taking en-route flights, a helicopter is less efficient with regard to aerodynamic lift due to missing wings.

BRIEF SUMMARY OF THE INVENTION

There may be a need to improve the drive of a vertical take-off aircraft.

According to an aspect, a vertical take-off aircraft is provided. The vertical take-off aircraft comprises a lift drive for generating a lifting force being effective in a vertical direction as well as a propulsion drive for generating a driving force being effective in a horizontal direction. The vertical take-off aircraft further comprises a motor for providing mechanical energy for the propulsion drive as well as a first generator for providing electrical energy for the lift drive. Moreover, the vertical take-off aircraft comprises an exhaust gas turbocharger for the motor with a first turbine being driven by the exhaust gas flow of the motor, wherein the first turbine is configured to provide mechanical energy for the propulsion drive. In particular, only the first turbine may be provided without an exhaust gas turbocharger being integrated within the vertical take-off aircraft. In such an embodiment, the first turbine would not be part of the exhaust gas turbocharger but being arranged separately.

In other words, a hybrid electric drive train or a hybrid electric drive system for VTOL (vertical take-off and landing) drones with at least two lift rotors and one tail propeller is provided. The drive train comprises a combustion engine with the fuel preferably being diesel or kerosene. Thus, piston engines, in particular reciprocating piston engines, or gas turbines may be provided as motors. Preferably, the aircraft, i.e., the drone, comprises a hybrid electric drive with an electric drive of four lift rotors as well as a mechanically driven tail propeller for the en-route flight.

With such a vertical take-off aircraft which may be a drone, for example, there arises the advantage that as a result of the combination of a mechanic direct drive with electrically driven lift rotors an efficient distribution of the drive power, and thus an energy efficient flight, may be realized. In particular, when using batteries in the drive train it is possible to make a targeted coordination of the battery weight to be installed and of the tank volume of the Diesel or kerosene fuel. It is further possible to coordinate or match the electrical energy provided for the lift rotors with the mechanical energy provided for the propulsion drive. This coordination or adjusting may take place by a controlling unit, for example.

It is also possible to carry out certain phases of a mission profile, i.e., during the flight, without operating the motor, so that an infrared or sound signature may be minimized. In other words, this means that heated exhaust gases can be reduced during flight in that the required lifting force is provided by the lift rotors rather than by the propulsion drive which is driven by the motor.

For example, the motor is a combustion engine. In particular, the motor is selected from the group consisting of a piston engine, a gas turbine or a fuel cell. The gas turbine is a micro gas turbine, for example.

The motor may provide mechanical energy to the propulsion drive by means of a shaft, for example. A generator may be arranged at this shaft, which generator at least in part transforms the mechanical energy provided by the motor for the propulsion drive into electrical energy as to provide this transformed electrical energy to the lift rotors. The first turbine of the exhaust gas turbocharger may be provided at a further shaft, for example, as to additionally provide mechanical energy for the propulsion drive, which further shaft is also referred to as second shaft in the following. A generator may be provided at this further shaft, which generator also at least in part transforms the mechanical energy provided by the turbine for the propulsion drive into electrical energy, so that this electrical energy is transmitted to the lift rotors, in particular to electric motors of the lift rotors. Thus, two shafts may be provided in parallel to each other and being coupled by means of a gearing mechanism, for example.

For example, the lift drive comprises a propeller, in particular a lift propeller. For example, the propulsion drive likewise comprises a propeller.

The turbine of the exhaust gas turbocharger utilizes an exhaust gas flow of the motor, for example, as to carry out a rotational movement so that the relaxation energy of the exhaust gas in the turbine is eventually transmitted to the shaft as mechanical energy as to thereby provide mechanical energy for the propulsion drive. The exhaust gas flow is here guided from the motor to the turbine via a separate line. The exhaust gas flow comprises an exhaust gas which arises within the motor as a result of a combustion process.

The vertical take-off aircraft may additionally comprise a fuselage, wherein protruding wings are attached to the fuselage. In particular, two pairs of wings protruding from the fuselage are arranged one after another. In turn, the lift rotors of the lift drive may be affixed to these wings. The propulsion drive may, for example, be affixed directly to the fuselage of the vertical take-off aircraft. Preferably, there are at least two lift rotors provided at the vertical take-off aircraft. However, it is also possible that three and, in particular, four lift rotors are provided at the vertical take-off aircraft. Thereby, it is possible that a lift rotor is affixed to each one of the wings of the pairs of wings. For example, these lift rotors are affixed at outer ends of the respective wings.

The vertical direction describes a direction which is aligned perpendicular to the ground, for example. The horizontal direction is a direction which is aligned in parallel to the ground, for example, and describes that direction along which the vertical take-off aircraft substantially moves during a horizontal flight.

According to an embodiment, the first generator is configured to provide the electrical energy for the lift drive by using at least a part of the mechanical energy provided by the first turbine.

Thus, it is possible to provide electrical energy, for example for a movement of the vertical take-off aircraft in vertical direction. Thereby and in particular, the lift drive is primarily used when moving in vertical direction, i.e., during vertical take-off or landing. On the other hand, the propulsion drive is primarily used during horizontal flight.

It is possible that the mechanical energy provided by the first turbine is at least in part transformed into electrical energy by the first generator so that a part of the mechanical energy provided by the first turbine can be provided to the propulsion drive and another part of the provided mechanical energy can be transformed into electrical energy by means of the first generator. Thus, the energy provided to the lift drive and the propulsion drive, respectively, may be adapted depending on the flight state.

According to a further embodiment, the vertical take-off aircraft comprises a second generator which is configured to transform at least a part of the mechanical energy provided by the motor into electrical energy as to provide this electrical energy to the lift drive.

In other words, the first generator is arranged at the same shaft at which also the first turbine is located and the second generator is arranged at the same shaft which is driven by the motor. These two shafts may be arranged separately, in particular in parallel to each other. For example, the first generator as well as the second generator is suitable to transform at least a part of the mechanical energy provided by the motor and/or the first turbine into electrical energy. Thus, electrical energy which is provided to the lift drive may be obtained from two generators which are working independently of one another, namely the first generator and the second generator. Here, a first shaft is driven by means of the motor, for example, and a second shaft is driven by means of the turbine, for example. However, a generator may be arranged at at least one of both shafts, which generator can generate electrical energy by using the provided shaft energy. Here, the shaft energy results from the rotational movement of the shaft.

According to a further embodiment, the vertical take-off aircraft further comprises a gearing mechanism which is configured to transmit the mechanical energy provided by the motor and/or the mechanical energy provided by the first turbine to the propulsion drive.

For example, the first shaft and the second shaft may be coupled to each other by means of the gearing mechanism so that a transmission ratio may also be set, for example. For example, the propulsion drive may be arranged at the first shaft which is driven by the motor, wherein the second shaft, which is driven by the first turbine, is connected or coupled with the first shaft by means of the gearing mechanism.

For example, a gearing box for accommodating the gearing mechanism may be located in the fuselage of the vertical take-off aircraft.

According to a further embodiment, the vertical take-off aircraft comprises a second turbine for providing mechanical energy to a third generator, wherein the third generator is configured to provide electrical energy to the lift drive.

It may be provided that the second turbine drives a third shaft so that the third generator in turn provides electrical energy from the shaft energy of the third shaft or from the rotational movement of the third shaft, wherein this electrical energy in turn is provided to the lift drive. It may be provided that the third generator completely transforms the mechanical energy provided by the second turbine into electrical energy as to, thereby, drive the lift rotors. For example, the second turbine is an expansion turbine which is likewise driven by means of an exhaust gas flow of the motor.

According to a further embodiment, driving of the second turbine takes place by the exhaust gas flow of the motor.

This exhaust gas flow may, for example, be part of the exhaust gas flow which already drives the first turbine.

According to a further embodiment, the vertical take-off aircraft further comprises a distribution unit for distributing or sharing the exhaust gas flow of the motor into a first exhaust gas flow share to be supplied to the first turbine and a second exhaust gas flow share to be supplied to the second turbine.

Thereby, an adjustable flap may be provided in the region of an outlet of the exhaust gas from the combustion engine or from the motor, which flap is configured to supply the exhaust gas flow exiting from the motor to the first turbine and/or to the second turbine in a targeted manner. Thereby, the amount of exhaust gas supplied to the respective turbine may be adjusted. This will be elucidated in more detail in the description of the drawings.

According to a further embodiment, the vertical take-off aircraft further comprises a controlling unit which is configured to adjust the first exhaust gas share and the second exhaust gas share as to thereby adjust the mechanical energy provided by the first turbine and the second turbine.

This results from the direct interaction between the exhaust gas flow passing through the respective turbine and the expansion energy in the turbine caused thereby. In this manner it is also possible to adapt the mechanical energy provided to the propulsion drive to the electrical energy provided to the lift drive. In other words, it is enabled by the third shaft and the third generator to provide the electrical energy provided to the lift rotors or the lift drive based on a further energy conversion system which is being separate from the first two shafts.

According to a further embodiment, the controlling unit is configured to adjust a share of the provided mechanical energy and a share of the provided electrical energy depending on a flight condition.

The controlling unit, which may also be referred to as power electronics, may, in particular, comprise various flight controllers or controlling electronics for controlling the vertical take-off aircraft. Thereby, controlling of the drive system may take place based on a captured or acquired flight condition. The flight condition may here be determined by corresponding sensors. In particular, flight data may be determined by the controlling unit, which flight data enable to determine how large the share of mechanical energy to be provided to the propulsion drive is. Likewise, an electrical energy required for the lift drive may be determined and adjusted by the controlling unit depending on the respective flight condition. Thereby, it is enabled to achieve an optimal adjustment between provided electrical energy and provided mechanical energy under various flight conditions.

According to a further embodiment, the exhaust gas turbocharger comprises a compressor which is driven by the first turbine, which compressor is configured to increase the working pressure in the motor.

For example, the compressor is arranged at the same shaft as the first turbine. In particular, the exhaust gas turbocharger may be arranged at the second shaft and compresses the air supplied to the motor so that the working pressure in the motor itself can be increased. For example, the motor is a combustion engine, as for example a piston engine, etc.

Eventually, by means of the exhaust gas turbocharger additional power for the motor may be provided.

According to a further embodiment, the propulsion drive comprises a propeller. The propulsion drive is further configured to transmit the provided mechanical energy to the propeller by means of a shaft, wherein the shaft comprises a coupling or clutch for transmission of the mechanical energy to the propeller. This shaft is the described first shaft, for example.

Hence, the coupling is arranged at the first shaft, for example. For example, the first shaft is that shaft which is driven by the combustion engine, i.e., by the motor itself. The coupling is arranged between the gearing mechanism and the propeller, for example. In particular, the system may be shifted to an idle state by means of the coupling, in which the first shaft, i.e., the drive shaft, is no longer connected with the propeller. By engaging the coupling, a power transmission from the shaft driven by the motor to the propeller is provided, in turn. Further, by means of the gearing mechanism, mechanical energy of the second shaft may be transmitted to the first shaft, i.e., the drive shaft, so that the mechanical energy which is provided by the first turbine and the mechanical energy which is provided by the motor itself are coupled.

According to a further embodiment, the vertical take-off aircraft comprises a wing structure which is configured to generate a lifting force for the aircraft during a horizontal movement of the aircraft.

Thereby, the horizontal movement takes place in parallel to the ground in the horizontal direction, for example. The lifting force is thereby provided by means of an aerodynamic lift generating profile of the wing structure, for example.

According to a further embodiment, the wing structure comprises two pairs of wings protruding from a fuselage of the aircraft, which two pairs of wings are arranged in horizontal direction one after another.

For example, the vertical take-off aircraft hence comprises a tandem wing structure. Thereby, the respective wings which protrude from the aircraft may protrude perpendicular from the fuselage or stand out of the same.

According to a further embodiment, the lift drive comprises at least two lift rotors, each of which is arranged at an end of the respective wings.

For example, the required lifting force is provided during vertical ascent, i.e., during the vertical flight of the vertical take-off aircraft, by means of these two lift rotors. However, there may also be affixed four lift rotors at the vertical take-off aircraft, in particular at the ends of each wing of the vertical take-off aircraft, so that there are optimal stability characteristics during the vertical flight of the vertical take-off aircraft. Thereby, occurrence of a lateral pitch of the aircraft may in particular be avoided.

According to a further embodiment, the vertical take-off aircraft further comprises a rechargeable energy storage for supplying electrical energy to the lift rotors. Thereby, the controlling unit is configured to adjust a ratio of the electrical energy provided by the first or the second or the third generator with regard to the electrical energy provided by the energy storage.

Hence, the supply of electrical energy may also be provided by an on-board battery, so that the lift drive may also be operated if the mechanical energy provided by the motor or by the turbines is transmitted exclusively to the propulsion drive and no electrical energy is provided by the generators. Provision of an energy storage within the vertical take-off aircraft further has the advantage that a weight distribution within the aircraft may be adapted effectively. A specific weight distribution may, in particular, be adjusted by provision of the energy storage at various positions within the vertical take-off aircraft.

Preferably, the installation of a combustion engine is provided for in the present description. For example, weight reduced diesel engines or micro gas turbines may be taken into account as combustion engines.

Corresponding diesel engines may be adapted such that they at least meet the requirement of a power to weight ratio of 0.75 kg/kW. Multi-fuel rotary piston engines with direct injection (common rail or pump/nozzle technique), gasoline direct injection combustion processes (externally ignited), loading, and exhaust energy recovery (turbo compound) may be considered here. One option exists in realizing a dual branch exhaust gas or drive system as described in more detail in the description of the drawings. Here, one branch has an exhaust gas turbocharger and another branch has an expansion turbine. The mechanical power of the expansion turbine may be, for example, mechanically coupled to the drive shaft of the tail propeller and/or be used for generating electrical energy for charging the batteries or for driving the electric motors of the lift rotors. Distribution of the exhaust gas takes place by means of a flap, for example. Thus, a demand control of the exhaust gas turbocharger is made possible. Hence, a so-called waste gate for blowing off excessive load pressure is not required. The excessive exhaust gas is fed to the expansion turbine. This will be elucidated in more detail in the description of the drawings.

Alternatively, a shaft coupled mechanic loader of any type can be used as a support, for example a Roots blower, or rotary vane compressor, or a G-loader, or a centrifugal compressor.

A corresponding arrangement for the motor is not limited to diesel rotary piston machines. A reciprocating piston engine may likewise be operated. A micro gas turbine in the design of a turboshaft machine may also be used instead of a piston machine. These can be operated with diesel as well as with kerosene. Micro gas turbines are simple one-shafted machines with a single-stage radial compressor and a single-stage axial turbine. In contrast to piston engines, the power to weight ratio is below 0.75 kg/kW, for example at about 0.2 kg/kW or better. The thermodynamic efficiency or efficiency factor is at about 10% of a 30 kW power plant, for example, as a result of the single-stage compressor. Enhancements of the efficiency factor are possible, for example, by a compressor intermediate cooling and an additional expansion turbine.

Fuel cells represent a further possible alternative. These may be operated with hydrogen or by a pre-reforming of diesel or kerosene. Here, usage of solid oxide fuel cells (SOFC, solid oxide fuel cell) may be required. The reforming may take place by means of a sub-stoichiometric combustion of diesel or kerosene resulting in hydrogen and carbon monoxide. The fuel gas H2/CO may be transformed by means of a SOFC.

The first, second and/or the third generator may comprise a starter generator which is configured to accelerate the motor of the aircraft (starter). The lift rotors comprise propellers which may be operated completely with the electrically provided energy, for example by means of electric motors. The electrical energy may be generated by means of the generators as well as be provided by the energy storage, in particular the batteries. A corresponding dimensioning of these components may be dependent on the size of the generator or the start generator. For this purpose, a weight optimization and power optimization may take place.

One may differentiate between various modes of operation of the motor and/or of the generators.

For example, the motor and the generator may be operated at constant speed. In particular, the propeller may be operated at maximum rotation or revolution. Thereby, operation of the generator may be in a synchronous or asynchronous mode.

For example, the motor and the generator may be operated at variable speed. In particular, a maximum speed may correspond to a combustion power of the motor, which combustion power may be adapted to a start or hover flight condition. Here, a synchronous mode of operation of the generator may be provided.

Preferably, the electric voltage in the drive system is 400 V direct current. Hence, the weight of possible electric supply lines one the one hand as well as of control and regulatory units (so-called power electronics) may be minimized. By providing direct current at 400 V, the lift rotors may provide a power of about 8 kW per each lift rotor. Preferably, four lift rotors are provided at the aircraft.

The motor is preferably operated with diesel or kerosene. The required maximum thrust power for the vertical flight or the hover flight may be about 150 kg (maximum take-off weight). This corresponds to a power of about 35 kW including electrical losses. This power may be achieved in a standard configuration of the turbocharger at about 6000 revolutions per minute. Additional electrical and/or mechanical energy may be provided by a turbo compound system which is either separated from the turbocharger or forms a unit with the turbocharger. The motor may be a so-called Hirth 2702V-motor or a so-called Hirth 3401V-motor. NACA air inlets or air fans may be provided for cylinder cooling of the piston engine.

BRIEF DESCRIPTION OF THE DRAWINGS

In the following, exemplary embodiments are described in more detail with reference to the attached drawings.

DETAILED DESCRIPTION

The representations in the drawings are schematic and not to scale.

If in the following description of the drawings similar reference signs are used in different drawings, these refer to equal or similar elements. However, equal or similar elements may be referred to by different reference signs.

Figure 1:
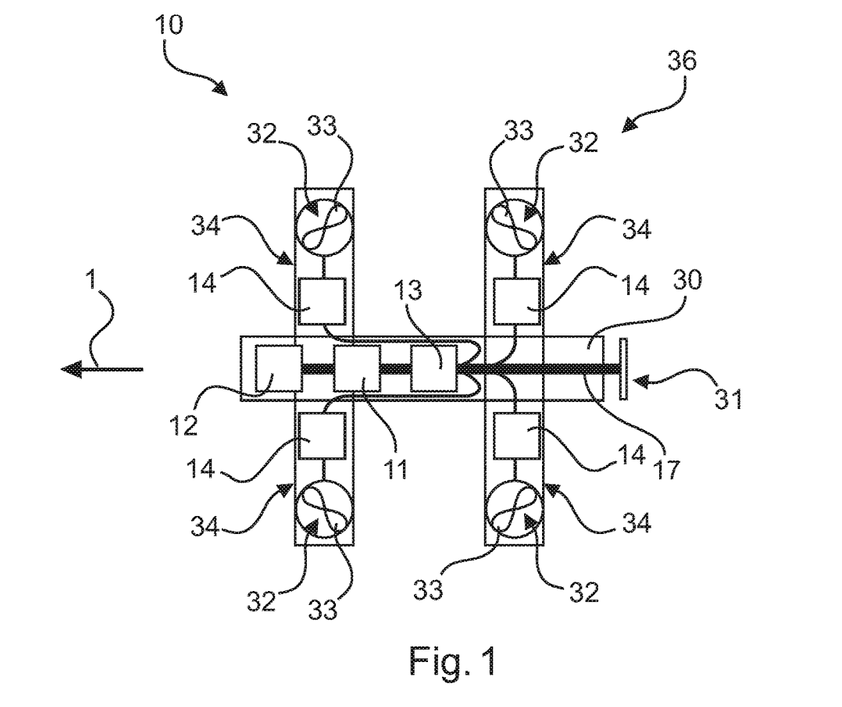
FIG. 1 shows a schematic representation of a vertical take-off aircraft according to an exemplary embodiment.

FIG. 1 shows a schematic representation of a vertical take-off aircraft 10 in a top view. The vertical take-off aircraft 10 comprises a motor 12 as well as a generator 11 and a controlling unit 13 which are arranged in a fuselage 30 of the vertical take-off aircraft 10, for example. Further, a first shaft 17 is provided, which shaft transmits mechanical energy provided by the motor 12 to a propulsion drive 31. For example, the propulsion drive 31 comprises a propeller. The generator 11 is configured to convert the shaft energy provided by the motor 12 into electrical energy and, in turn, to provide this electrical energy to electric motors 14. Lift rotors 33 of a lift drive 32 may be driven on the basis of the electrical energy provided to the electric motors 14 as to generate a lifting force in a vertical direction which protrudes from the image plane of FIG. 1. The propulsion drive 31 is configured to provide a driving force in a horizontal direction 1.

The vertical take-off aircraft 10 comprises a wing structure 36, for example, which in turn comprises two pairs of wings 34 that are affixed to the fuselage 30 and arranged one after another. In that case shown in FIG. 1, the respective wings 34 protrude perpendicularly from the fuselage. At the respective ends of the wings 34, a lift rotor 33 is arranged in each case as to provide the lifting force required for a vertical flight of the vertical take-off aircraft 10. In particular, good stability of the vertical take-off aircraft 10 during the flight and, hence, good hover flight characteristics may be provided due to such an arrangement of the lift rotors 33. For example, the motor 12 is a combustion engine. The motor 12 may be, for example, a piston engine, a micro gas turbine or a fuel cell. The controlling unit 13 is configured to adapt the mechanical energy provided to the propulsion drive 31 and/or the electrical energy provided to the lift drive 32 depending on a flight condition.

Figure 2:
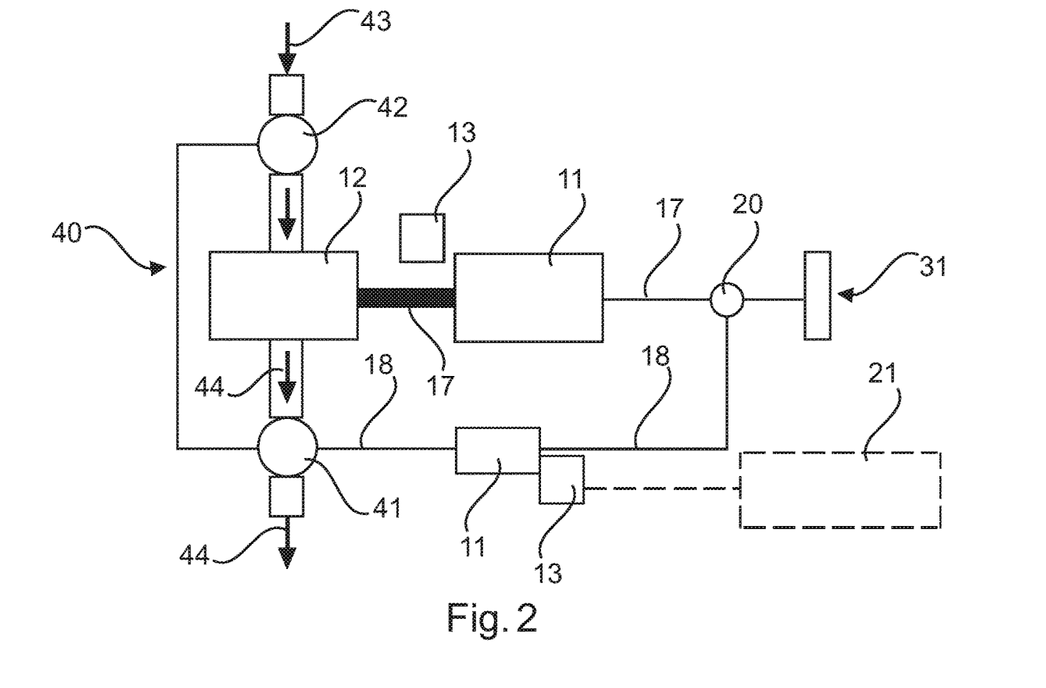
FIG. 2 shows a schematic representation of a drive system with an exhaust gas turbocharger according to an exemplary embodiment.

FIG. 2 shows a schematic representation of a drive system with an exhaust gas turbocharger 40 which causes an increase in power of the motor 12. Here, air 43 flows into a compressor 42 of the exhaust gas turbocharger 40 and is, therefore, supplied to the motor 12 in a compressed manner. Hence, the working pressure in the motor 12 may be increased by the exhaust gas turbocharger 40. In turn, an exhaust gas 44 from the motor 12 gets through a first turbine 41 of the exhaust gas turbocharger 40 and subsequently to an outlet off of the vertical take-off aircraft 10. The first turbine 41 of the exhaust gas turbocharger 40 is coupled with a second shaft 18, for example, so that the first turbine 41 which is driven by the exhaust gas flow 44 transmits mechanical shaft energy to a generator 11, which generator in turn provides electrical energy to the lift drive. Thereby, the electrical energy is provided to the electric motors 14 of the lift drives 32. Furthermore, electrical energy may be provided or transmitted to the lift drive 32 by a rechargeable energy storage 21. The motor 12, which is a combustion engine, for example, in turn drives a first shaft 17 by which eventually the propulsion drive 31 is driven. Here, a generator 11 may be provided at the first shaft 17 which transforms at least a part of the mechanical shaft energy provided by the motor 12 into electrical energy as to provide this electrical energy to the lift drive 32. The mechanical energy provided by the first turbine 41 may be transmitted by the shaft energy of the second shaft 18 to the first shaft 17 via a gearing mechanism 20 so that the mechanical energy which is provided by the motor 12 and the mechanical energy which is provided by the first turbine 41 are transmitted to the propulsion drive 31 in a coupled manner. Thus, two generators 11 which work independently of each other as well as two shafts 17, 18 which turn independently of each other are available. Thus, an adjustment of the electrical energy provided to the lift drive 32 and of the mechanical energy provided to the propulsion drive 31 may be made efficiently.

Figure 3:
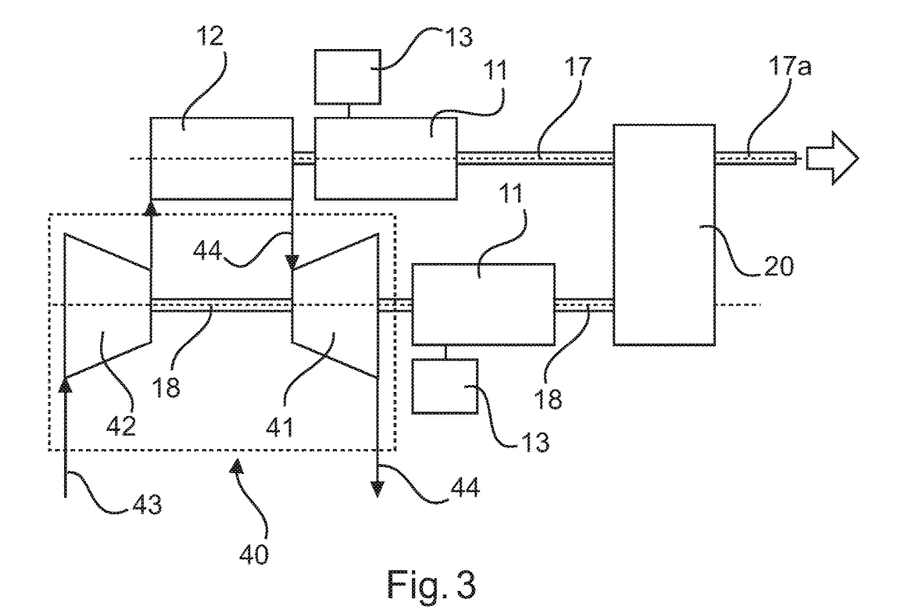
FIG. 3 shows a schematic representation of a drive system with an exhaust gas turbocharger and two separate generators according to an exemplary embodiment.

FIG. 3 shows a schematic representation of a drive system with the exhaust gas turbocharger 40, wherein the first turbine 41 drives the second shaft 18 as to, thereby, provide mechanical energy for the propulsion drive 31 which is not shown in FIG. 3. Furthermore, the motor 12, which is a combustion engine, for example, drives the first shaft 17 and, hence, likewise provides mechanical energy for the propulsion drive 31. The shaft power energy of the first shaft 17 as well as of the second shaft 18 may be coupled to each other by means of a gearing mechanism 20 so that the mechanical energy provided by the first turbine 41 and the mechanical energy provided by the motor 12 may be transmitted to the propulsion drive 31 simultaneously. The coupled mechanical energy may thereby be transmitted to the propulsion drive 31 via a further separate shaft 17*a*. Here, the further separate shaft 17*a* is arranged on the same axis as the first shaft 17 or it forms a part of the first shaft 17.

Further, the compressor 42 is arranged at the second shaft 18, which compressor compresses an air flow 43 prior to entry into the motor 12. Thereby, a higher working pressure may be provided in the motor 12 which causes an increase of power. Therefore, the exhaust gas turbocharger 40 is formed, for example, by the first turbine 41, the second shaft 18 and the compressor 42 as well as the respective inlet and outlet devices of the air and exhaust gas flows, respectively. In particular, the exhaust gas flow 44 of the combustion engine 12 is provided to the turbine 41, which exhaust gas flow therefore drives the turbine 41.

The mechanical energy provided by the motor 12 may at least in part be converted into electrical energy by means of a generator 11 which is arranged at the first shaft 17, which electrical energy is subsequently provided to the respective electric motors 14 of the lift drive 32. The mechanical shaft power energy provided to the propulsion drive 31 may be adjusted to the electrical energy provided to the lift drive 32 by means of the controlling unit 13. A further generator 11 may be provided at the second shaft 18, which further generator may be referred to as first generator 11, for example. The generator 11 arranged at the first shaft 17 is referred to as second generator 11, for example.

However, at least a share of the mechanical energy, i.e., shaft power energy, provided by the first turbine 41 may be transformed into electrical energy by means of the first generator 11 which is arranged at the second shaft 18. Here, too, the controlling unit 13 may adjust the share of the mechanical energy provided to the propulsion drive 31 and the electrical energy provided to the lift drive 32. Thus, the electrical energy which is provided to the lift drive 32 may be provided by two separate generators 11, namely the first generator 11 and the second generator 11.

Figure 4:
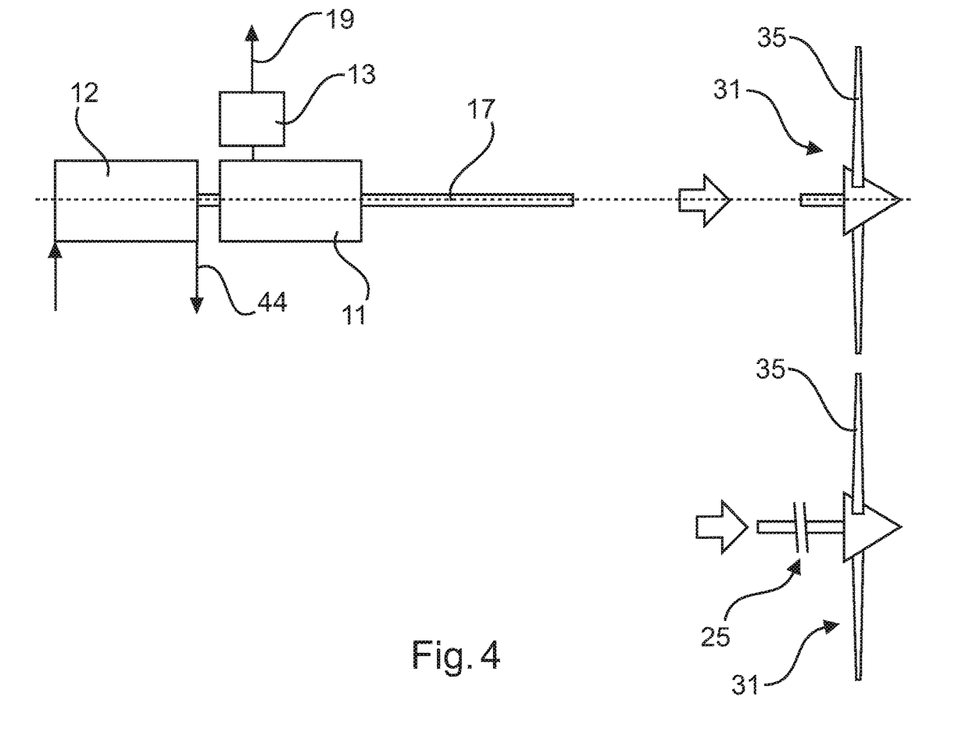
FIG. 4 shows a schematic representation of a propulsion drive according to an exemplary embodiment.

FIG. 4 shows a schematic representation of a section of the drive system, in particular the transmission of the shaft power energy or shaft energy to the propulsion drive 31. Here, a coupling 25 may be provided at the first shaft 17, which coupling is arranged between the shaft drive, i.e. the motor 12, and the propulsion drive 31. A power transmission from the first shaft 17 to the propulsion drive 31 may be provided or prevented by coupling or decoupling of the coupling 25. Further, FIG. 4 shows the generator 11 which obtains electrical energy from the shaft power energy of the shaft 17 and transmits the same to electric motors 14 of the lift drive 32. Transmission of the electrical energy from the generator 11 may here be controlled by the controlling unit 13, for example, wherein controlling signals 19 are transmitted to the respective electric motors 14 of the lift drives 32. Thus, a demand oriented adjustment of the provided respective electrical energy may take place depending on the flight condition of the vertical take-off aircraft 10.

The propulsion drive 31 further comprises a propeller 35 which generates an impulse for the vertical take-off aircraft 10 as a result of a rotational movement and thus ensures driving the vertical take-off aircraft 10 in the horizontal direction 1.

Figure 5:
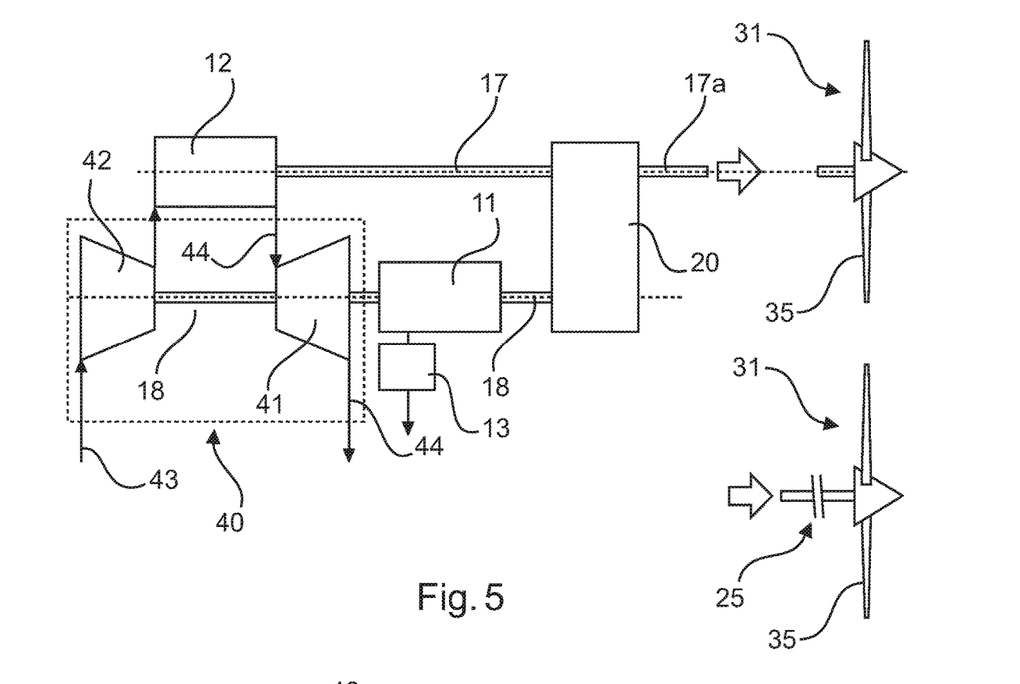
FIG. 5 shows a schematic representation of a drive system with an exhaust gas turbocharger and a generator according to an exemplary embodiment.

FIG. 5 shows a schematic representation of a further example of the drive system for the vertical take-off aircraft 10, wherein the drive system comprises a generator 11 only at the second shaft 18 and the first shaft 17 does not comprise a generator 11. Here, the mechanical energy provided by the motor 12, in particular the shaft power energy of the shaft 17, is completely transmitted to the propulsion drive 31. Only the mechanical energy provided by the first turbine 41 may be converted into electrical energy by the first generator 11 which is arranged at the second shaft 18. The first turbine 41, which is part of the exhaust gas turbocharger 40, is driven by the exhaust gas flow 44 from the combustion engine 12. Thereby, the exhaust gas is relaxed when passing the first turbine 41.

The drive system shown in FIG. 5 may be referred to as a so-called single flow system, for example, as here only the first turbine 41 is driven by the exhaust gas flow 44. Each of the exemplary embodiments described here which comprises only one turbine, i.e., the first turbine 41, may be referred to as a single flow system.

Figure 6:
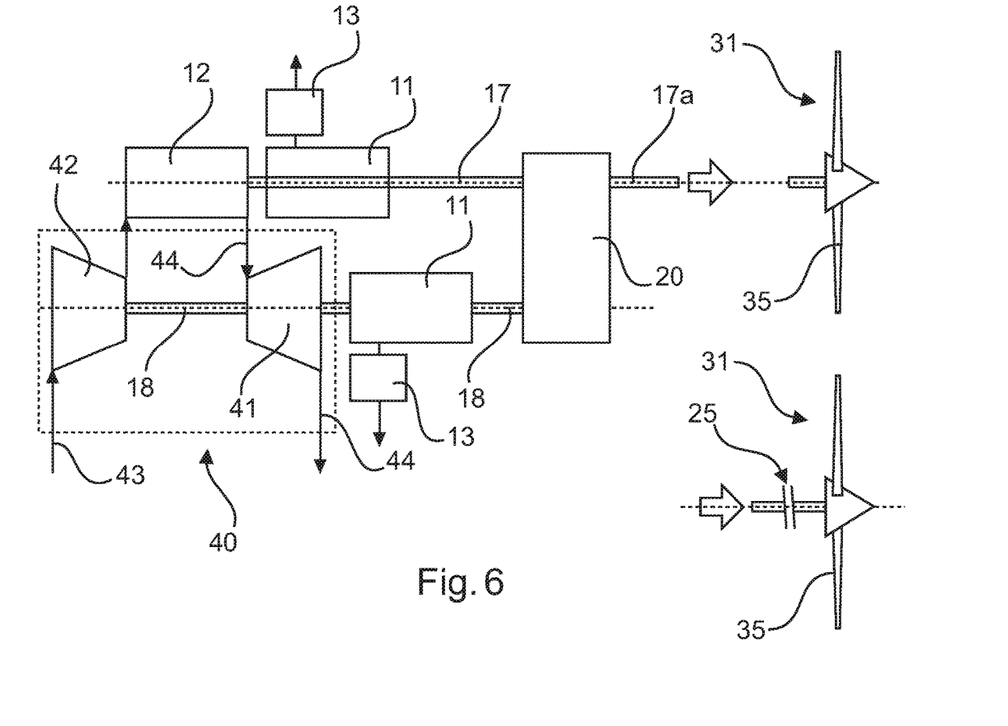
FIG. 6 shows a schematic representation of a drive system with an exhaust gas turbocharger and two separate generators according to a further exemplary embodiment.

FIG. 6 shows a schematic representation of the drive system for the vertical take-off aircraft 10, which is likewise designed as single flow system. In particular, only the first turbine 41 is driven by the exhaust gas flow 44. However, a second generator 11 is thereby arranged at the first shaft 17 and provides an additional medium for providing electrical energy for the lift drive 32 besides the first generator 11 which is arranged at the second shaft 18. The mechanical energy to be converted into electrical energy by means of the generators 11 may be adjusted and/or defined by the controlling unit 13. In particular, an adjustment of the mechanical energy provided by the first turbine 41 or by the motor 12 with respect to the electrical energy converted by the generators 11 may be set. This setting or adjustment of the provided mechanical energy and of the provided electrical energy may result in an improvement of the adjusting of the vertical take-off aircraft 10 to various flight conditions.

Figure 7:
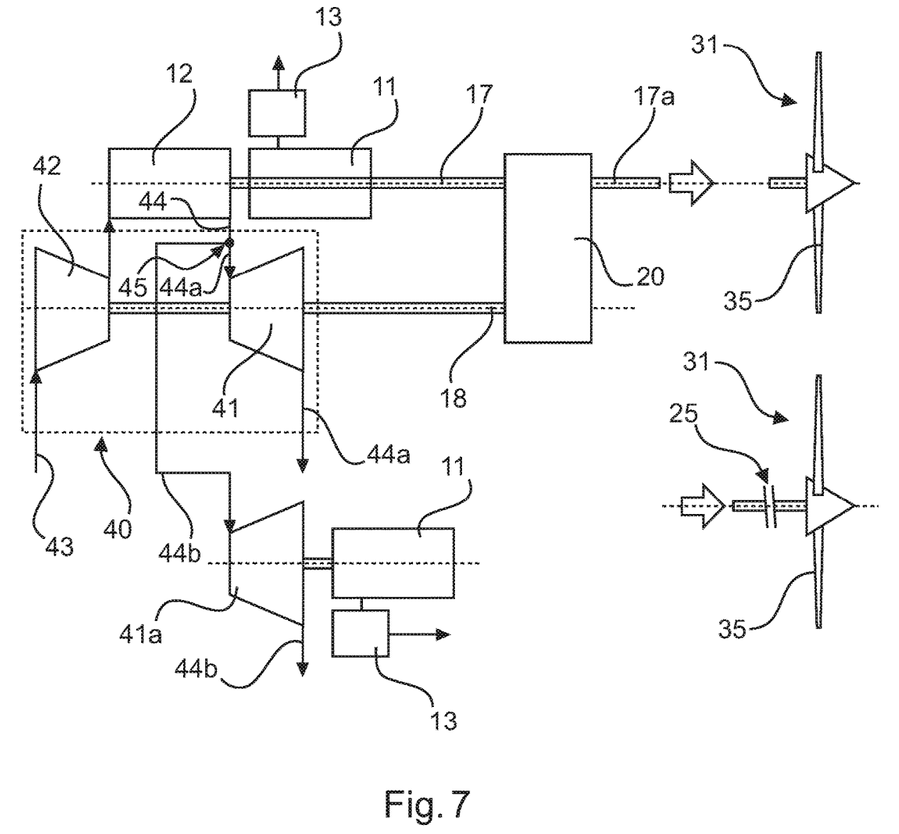
FIG. 7 shows a schematic representation of a drive system with an exhaust gas turbocharger and two separate turbines according to an exemplary embodiment.

In FIG. 7, a so-called double flow drive system of the vertical take-off aircraft 10 is shown. In particular, the exhaust gas flow 44 which leaves the motor 12 is split into a first exhaust gas share 44*a* to be supplied to the first turbine 41 and a second exhaust gas share 44*b* to be supplied to a second turbine 41*a*. For this splitting, a distribution unit 45 which is designed as a flap or a valve is provided subsequent to the outlet of the exhaust gas flow 44 from the combustion engine 12. For example, the second turbine 41*a* likewise drives a shaft at which in turn a third generator 11 is arranged. This third generator 11 provides electrical energy for the lift drive 32, for example. It may be provided that the third generator 11 is configured to convert the entire mechanical energy provided by second turbine 41a into electrical energy and to supply the electric motors 14 of the lift drive 32 with the same. On the other hand, there is no generator 11 arranged at the second shaft 18 at which the first turbine 41 is arranged, too, so that the entire mechanical energy provided by the first turbine 41 is provided to the propulsion drive 31. Only at the first shaft 17 there is provided one more generator 11 which likewise may provide electrical energy for the lift drive 32.

By splitting the exhaust gas flow 44 into a first exhaust gas share 44a and a second exhaust gas share 44b which flow through, and therefore drive, two separate turbines 41, 41a, respectively, it may be achieved that the mechanical energy for the propulsion drive 31 may be adjusted fully independent of the electrical energy provided for the lift drive 32. This adjusting may in particular take place by the distribution unit 45 which controls the first exhaust gas share 44a and the second exhaust gas share 44b. In particular, a ratio between the first exhaust gas share 44a and the second exhaust gas share 44b may be defined or adjusted, for example by means of the controlling unit 13.

Figure 8A:
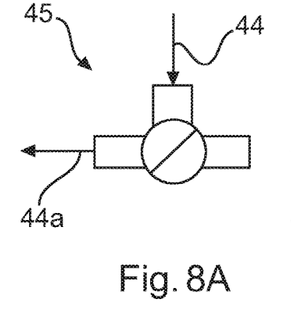
FIG. 8A shows a distribution of an exhaust gas flow from a motor according to an exemplary embodiment.

FIG. 8A shows a schematic view of the distribution unit 45 for the case that the entire exhaust gas flow 44 coming from the motor 12 is supplied to the first turbine 41. Thereby, the first exhaust gas share 44a which corresponds to the exhaust gas share of the exhaust gas flow 44 is completely lead to the first turbine 41.

Figure 8B:
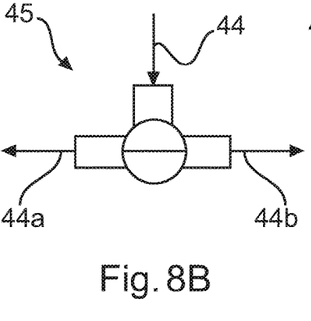
FIG. 8B shows a distribution of an exhaust gas flow from a motor according to a further exemplary embodiment.

FIG. 8B shows the distribution unit 45 for the case that the exhaust gas flow 44 is lead to the first turbine 41 or to the second turbine 41a in equal or different shares 44a, 44b.

Figure 8C:
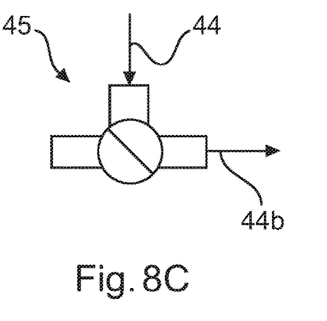
FIG. 8C shows a distribution of an exhaust gas flow from a motor according to a further exemplary embodiment.

FIG. 8C shows the distribution unit 45 for the case that the entire exhaust gas flow 44 coming from the motor 12 is supplied to the second turbine 41a. Thereby, the second exhaust gas share 44b which is supplied to the second turbine 41a corresponds to the share of the exhaust gas flow 44 coming from the motor 12.

Additionally, it is noted that "comprising" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A vertical take-off aircraft, comprising:
a propulsion drive for generating a driving force effective in a horizontal direction;
a lift drive for generating a lifting force effective in a vertical direction;
a motor for providing mechanical energy for the propulsion drive;
a first shaft mechanically coupled to the motor and to the propulsion drive;
a first generator for providing electrical energy for the lift drive;
an exhaust gas turbocharger for the motor, the exhaust gas turbocharger comprising a first turbine driven by an exhaust gas flow of the motor and a compressor driven by the first turbine, the compressor configured to increase the working pressure in the motor;
a second shaft, wherein the compressor is directly driven by the first turbine via the second shaft; and
a gearing mechanism mechanically coupled directly to the first shaft and the second shaft,
wherein the first turbine is mechanically coupled to a second shaft for transmitting mechanical energy via the first shaft and the gearing mechanism to the propulsion drive.

2. The vertical take-off aircraft of claim 1,
wherein the first generator is configured to provide the electrical energy for the lift drive by using the mechanical energy provided by the first turbine.

3. The vertical take-off aircraft of claim 1, further comprising:
a second generator configured to convert at least a share of the mechanical energy provided by the motor into electrical energy and to provide the electrical energy to the lift drive.

4. The vertical take-off aircraft of claim 1,
wherein the gearing mechanism is configured to transmit at least one of the mechanical energy provided by the motor and the mechanical energy provided by the first turbine to the propulsion drive.

5. The vertical take-off aircraft of claim 1, further comprising:
a second turbine for providing mechanical energy to a second generator,
wherein the second generator is configured to provide electrical energy to the lift drive.

6. The vertical take-off aircraft of claim 5, wherein the exhaust gas flow of the motor is configured to drive the second turbine.

7. The vertical take-off aircraft of claim 6, further comprising:
a distribution unit for distributing the exhaust gas flow of the motor into a first exhaust gas flow share supplied to the first turbine and a second exhaust gas flow share supplied to the second turbine.

8. The vertical take-off aircraft of claim 7, further comprising:
a controlling unit configured to regulate the first exhaust gas share and the second exhaust gas share as to regulate the mechanical energy provided by the first turbine and the second turbine.

9. The vertical take-off aircraft of claim 8, wherein the controlling unit is configured to regulate a share of the provided mechanical energy and a share of the provided electrical energy depending on a flight condition.

10. The vertical take-off aircraft of claim 1,
wherein the propulsion drive comprises a propeller, and
wherein the propulsion drive is configured to transmit the provided mechanical energy to the propeller via the first shaft shaft, and wherein the first shaft comprises a coupling for transmission of the mechanical energy to the propeller.

11. The vertical take-off aircraft of claim 1, further comprising:
a wing structure configured to generate a lifting force for the aircraft during a horizontal movement of the aircraft.

12. The vertical take-off aircraft of claim 11, wherein the wing structure comprises two pairs of wings protruding from a fuselage of the aircraft and arranged one after another in horizontal direction.

13. The vertical take-off aircraft of claim 12, wherein the lift drive comprises at least two lift rotors each of which is arranged at an end of the wings.

14. The vertical take-off aircraft of claim 1, further comprising:
a rechargeable energy storage for supplying electrical energy to the lift rotors;
wherein the controlling unit is configured to set a ratio of the electrical energy provided by the first generator to the electrical energy provided by the energy storage.

* * * * *